United States Patent [19]
Rogers et al.

[11] Patent Number: 5,215,672
[45] Date of Patent: Jun. 1, 1993

[54] PURIFICATION OF FGD GYPSUM PRODUCT

[75] Inventors: Kevin J. Rogers, Wadsworth; Fred Covert Owens, II, N. Canton, both of Ohio

[73] Assignee: The Babcock & Wilcox Company, New Orleans, La.

[21] Appl. No.: 937,775

[22] Filed: Sep. 1, 1992

[51] Int. Cl.⁵ .............................................. B01D 21/20
[52] U.S. Cl. .................................... 210/787; 210/749; 210/765; 210/805; 210/512.1
[58] Field of Search ............... 210/767, 787, 749, 765, 210/805, 512.1, 512.2; 423/240 R, 242.1–242.7

[56] References Cited

U.S. PATENT DOCUMENTS 4,203,954  5/1980  Asanagi ............................ 423/242.3
4,687,649  8/1987  Kuroda et al. .................... 423/240 R
5,132,027  7/1992  Ukawa et al. ..................... 210/787

Primary Examiner—Mary Lynn Theisen
Assistant Examiner—David Reitsnyder
Attorney, Agent, or Firm—Robert J. Edwards; Michael L. Hoelter

[57] ABSTRACT

A process of purifying the gypsum slurry end product produced by a flue gas desulfurization process which incorporates fine solids separation/classifying, dewatering, mixing, and filtering to both achieve a useful gypsum product and to recycle as much process water as possible to the flue gas desulfurization process. This purification process separates the incoming gypsum slurry into a fine solids stream containing a disproportionate amount of impurities therein that are concentrated and subsequently disposed of and a coarse solids stream containing a large amount of gypsum therein from which a usable gypsum product is recovered.

8 Claims, 1 Drawing Sheet

PURIFICATION OF FGD GYPSUM PRODUCT

FIELD OF THE INVENTION

This invention pertains to flue gas desulfurization and more particularly to a means of purifying the gypsum slurry end product of such a process.

BACKGROUND OF THE INVENTION

The resultant end or by-product of flue gas desulfurization (FGD) is often a gypsum slurry. Impurities that enter the FGD system with the flue gas, reagent, make-up water, etc., subsequently translate to varying levels of contaminants present in the gypsum slurry. It is desirable to purify this gypsum slurry by reducing the contaminants therein. Such a purified product has greater commercial worth due to the reduction of undesirable contaminants such as flyash, unburned carbon, limestone impurities, and ultra fine particulate that adversely effect its end use in industries such as the manufacture of wallboard. In terms of disposability, a purified end product results in less disposal cost or liability due to a reduction in impurities which, if not removed, can provide sources of leachable metal.

It is an object of this invention to utilize hydroclones to selectively remove undesirable constituents, in the form of fine solids, from the FGD end product. Additionally, with these contaminants removed, downstream clarifiers, press filters, and/or other dewatering devices can be used to further concentrate the undesirable solids stream so that these solids can be eliminated without also discarding any salvageable process return water. As far as is known, such use of a hydroclone is not known to exist for the purpose of purifying the FGD gypsum slurry end product.

SUMMARY OF THE INVENTION

This invention pertains to a purification process for the gypsum slurry end product resulting from a flue gas desulfurization system. This purification process incorporates the steps of delivering the gypsum slurry to a primary dewatering device where it is separated into a coarse solids stream and a fine solids stream. Generally, this primary dewatering device consist of one or more hydroclones where the incoming solids are concentrated, selectively classified, and separated with respect to their physical characteristics. These hydroclones separate the solids in a manner that route a disproportionate amount of the smaller particle size fractions to the fine solids stream leaving the coarse solids stream with a larger percentage of coarse particle sizes.

All or a portion of the fine solids stream is subsequently returned, as needed, back to the upstream flue gas desulfurization process or, in the alternative, all or a portion of this fine solids stream is delivered to downstream separation means. These downstream separation means separate the delivered fine solids stream into a thickened fines stream and a process water stream with the process water stream thereafter being selectively delivered, as desired, to the upstream flue gas desulfurization process. Concurrently, the coarse solids stream is delivered to a surge/mix tank where it is selectively mixed with a portion of the thickened fines stream from the downstream separation means prior to being delivered to a secondary dewatering device. From this secondary dewatering device, a purified gypsum product is collected.

DETAILED DESCRIPTION OF THE INVENTION

Figure 1:
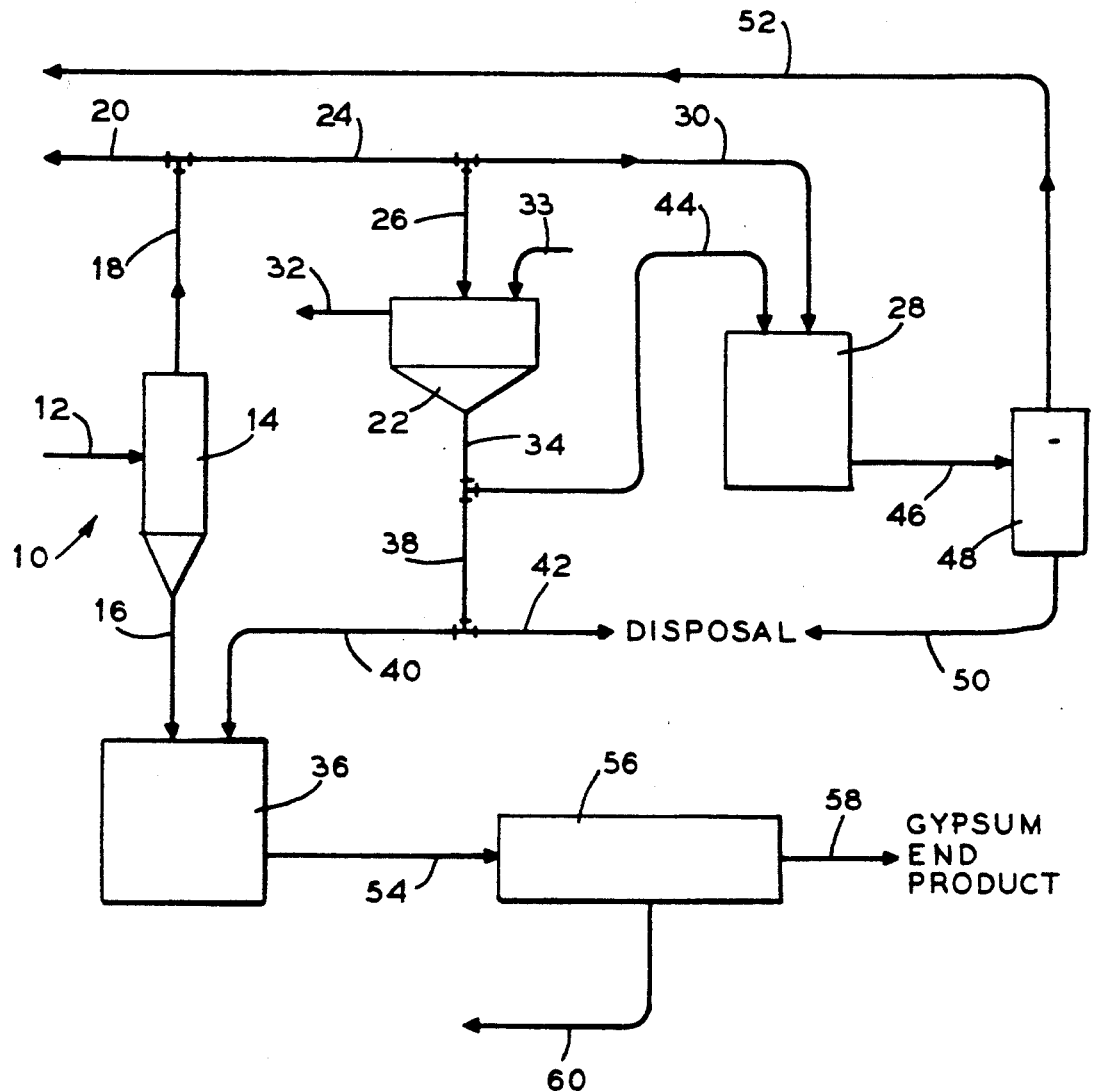
FIG. 1 is a schematic diagram of the procedure contemplated herein whereby the gypsum slurry end product of a FGD process is purified.

Referring to FIG. 1, there is disclosed FGD purification process 10 beginning with process feedstock 12. Feedstock 12 generally consists of FGD sludge blowdown or spent gypsum slurry removed from a FGD absorber system (not shown) upstream of purification process 10. This gypsum slurry or feedstock 12 is delivered to primary dewatering device 14 for initial dewatering or separation in order to segregate feedstock 12 into coarse solids stream 16 and fine solids stream 18. As shown, coarse solids stream 16 exits primary dewatering device 14 at its bottom while fine solids stream 18 exits primary dewatering device 14 at its top.

Primary dewatering device 14, preferably consisting of one or more hydroclones, is used to concentrate the incoming solids from feedstock 12 according to their physical characteristics. These hydroclones separate the solids in a manner that route a disproportionate amount of the fine particle size fractions to fine solids stream 18 leaving coarse solids stream 16 with a greater percentage of coarse particle size fractions. Thus, any undesirable contaminants, which generally are of the fine particle size, can be concentrated in fine solids stream 18 and will be conspicuously lacking in coarse solids stream 16 from which the desired gypsum end product is recovered.

The undesirable impurities found in feedstock 12 generally consist of flyash, unused reagents, trace metals, and various other compounds that enter the FGD absorber system. Primary dewatering device 14 facilitates classification of these various solids based on physical size, density, crystal morphology, etc., in addition to its dewatering/thickening function. Consequently, and as stated above, after this initial dewatering, fine solids stream 18 will contain a greater proportion of undesirable impurities than will be found in coarse solids stream 16 due to the physical characteristics of these undesirable impurities.

As shown, fine solids stream 18, coming from primary dewatering device 14, is selectively delivered, in whole or in part, either back to the FGD absorber system via line 20, to clarifier 22 via lines 24 and 26, or to a downstream surge/mix tank 28 via line 30. Because stream 18 contains a significant amount of fine solids, it is often useful as a return stream to the FGD absorber system and thus line 20. However, if a more solids-free return stream supply is required by the FGD system, either to minimize the accumulation of fine solids or their build-up in the FGD system, stream 18 can be further dewatered via lines 24 and 26 and clarifier 22 (or other similar device) with the clarifier overflow providing the desired clean process water stream 32 that can be selectively returned or delivered to the upstream FGD absorber system. Also, by further dewatering fine solids stream 18, the impurities concentrated therein can be eliminated from process 10 in a manner that minimizes the waste of salvageable process water which can be recycled.

Furthermore, clarifier 22 provides an acceptable site for the addition of chemical additives 33. Some such additives, such as polymers, promote the concentration of fine solids still in stream 26 while other additives, such as lime, help precipitate undesirable metal impurities still in solution so that they can be eliminated as thickened fines stream 34. The actual flow of stream 18 through line 20 or line 24 from dewatering device 14 depends on the desired method of operation of the FGD absorber system in order to suit the individual plant and product quality goals.

While it is conceivable for FGD purification process 10 to end with primary dewatering device 14 should the purity requirements of coarse solids stream 16 be met, it is possible these requirements have been exceeded. If the purity requirements for coarse solids stream 16 have been exceeded, then a portion of fine solid stream 18 will be recycled or combined with coarse solids stream 16 so as not to unnecessarily reduce the final product production rate.

When these purity requirements are exceeded and it becomes economically advantageous to mix a certain portion of fines stream 18 back into coarse stream 16 to increase production and reduce waste, such mixing is accomplished by making all or a portion of thickened fines stream 34 from clarifier 22 available for re-mixing with stream 16 in surge/mix tank 36. The desired proportions to be mixed in surge/mix tank 36 is dependant upon the composition of the solids in the two streams 16 and 34. As shown, line 38 delivers the desired portion of stream 34 to surge/mix tank 36 via line 40 while the reminder of line 38 exits the system for subsequent disposal, such as in a waste pond for example, via line 42.

In some cases, it may be desirable to further de-water or concentrate the fine solids in thickened fines stream 34. This is accomplished by diverting the desired amount of this stream 34 to be further dewatered to line 44. In turn, line 44 delivers this portion to surge/mix tank 28 where it is combined with line 30. Line 30 is that portion of stream 18 which is not delivered to clarifier 22 via line 26 and which is not returned to the FGD absorber system via line 20. A purpose of surge/mix tank 28 is to provide a controlled feed, via line 46, of the mixture of lines 30 and 44 to press filter 48.

Press filter 48, which can be of the tube, plate, or cloth/screen type, concentrates the fines and further de-waters either or both the overflow from primary dewatering device 14 (via line 30) and/or thickened fines stream 34 (via line 44). This arrangement eliminates more solids or fines from the FGD system such that the collected and subsequently removed sludge is delivered, via line 50, outside process 10 for subsequent disposal, sludge stabilization, and/or fixation. The resultant filtered water stream 52 from press filter 48 is selectively delivered back to the FGD absorber system, when needed, as process water, much the same as lines 20 and/or 32, only cleaner with respect to suspended solids.

Thus, purity permitting, it is possible for fine solids stream 18 from primary dewatering device 14 to be sent, as needed, directly to the FGD absorber system via line 20. Should the purity of this stream 20 not be sufficient enough, in terms of suspended solids, for this purpose, stream 18 can be sent to clarifier 22 for further purification and/or clarification so that a cleaned process water stream 32 can be sent to the upstream FGD system. Should this clean process water stream 32 still not be sufficiently solids free for use as process water in the FGD system, stream 18 can be further filtered by first being delivered to surge/mix tank 28. Afterwards, it is subsequently processed in press filter 48 where the resultant filtered water is selectively delivered, as needed to the upstream FGD process via line 52. In each case, the removed solids are either used for later mixing (lines 16, 40, and 44) or for ponding or other type of disposal (lines 42 and 50).

Focusing now upon coarse solids stream 16 coming from primary dewatering device 14, this stream 16 is, as shown, routed to surge/mix tank 36. Stream 16 is basically a purified gypsum product in slurry form. Surge/mix tank 36 is used to mix concentrated impurities or fines (via line 40) back into coarse solids stream 16 for greater control over the level or degree of fines and impurities that are eventually removed. If desired, the option to re-mix impurities back could be eliminated by routing stream 16 directly to secondary dewatering device 56 (this option not being shown in the drawings).

Underflow discharge stream 54 from surge/mix tank 36 is then delivered to secondary dewatering device 56. Secondary dewatering device 56 can be a rotary vacuum filter, a belt vacuum filter, a centrifuge, a filter press or otherwise, its main purpose being to further de-water concentrated discharge stream 54. Secondary dewatering device 56 provides the final dewatering of the slurry of stream 54 in order to produce a handleable bulk solid which is the desired dewatered gypsum product. This gypsum product is discharged from secondary dewatering device 56 (and also from purification process 10) via line 58, such as by mechanical conveyors (not shown). Line 60 discharges the cleaned waste water from secondary dewatering device 56, this cleaned waste water also being available for delivery as process water to the upstream FGD system. Thus, the solids entering secondary dewatering device 56 are recovered as a final product and the filtrate is available as clarified process water.

One advantage of purification process 10 is the ability to offset disposal costs by providing a marketable product for sale. This process 10 is also useful in reducing the quantity or volume of undesirable constituents that must be disposed of. Additionally, improved marketability of FGD gypsum is achieved by providing a purified product with a reduction in any undesirable impurities that may have been acquired in the FGD absorber system. Still another advantage is the ability to improve the performance of the FGD absorber and dewatering system by eliminating fines from the process. Thus, process 10 is able to achieve a purified gypsum product with greater commercial worth than was previously possible from FGD systems plagued with fine solid contaminants. Potential for less disposal liability by reducing, for example, the volume of leachable metals, also exists when the FGD gypsum is intended to be disposed of in a landfill, stacked, or otherwise similarly disposed of.

What is claimed is:

1. A method of purifying a gypsum slurry resulting from an upstream flue gas desulfurization process comprising the steps of:
   (a) delivering the gypsum slurry to a primary dewatering device;
   (b) separating this gypsum slurry in said primary dewatering device into a coarse solids stream and a fine solids stream, said coarse solids stream primarily containing coarse particle sizes therein and said fine solids stream primarily containing fine particle sizes therein;
   (c) selectively returning all or a portion of said fine solids stream back to the upstream flue gas desulfurization process or delivering all or a portion of said fine solids stream to downstream separation means for further separation into a thickened fines stream and a process water stream, said process water stream thereafter being selectively delivered, as desired, to the upstream flue gas desulfurization process;

(d) delivering said coarse solids stream to a surge/mix tank where it is selectively mixed with a portion of said thickened fines stream prior to being delivered to a secondary dewatering device; and, (e) collecting a purified gypsum product from said secondary dewatering device 2. The method as set forth in claim 1 wherein said primary dewatering device comprises one or more hydroclones for particle concentration and separation with respect to their physical characteristics thereby producing said coarse solids stream and said fine solids stream.

3. The method as set forth in claim 2 wherein said downstream separation means comprises the step of clarifying, in a clarifier, said fine solids stream into said thickened fines stream and said process water stream, said clarifying step accumulating said fine particle sizes found in said fine solids stream and delivering same to said thickened fines stream.

4. The method as set forth in claim 3 further comprising the step of adding additives to said clarifier, said additives optionally comprising polymers or lime compounds, for the further concentration of said fine particle sizes contained in said fine solids stream and/or for the precipitation of metal impurities still in solution in said fine solids stream.

5. The method as set forth in claim 4 wherein said downstream separation means further comprises the step of filtering, in a filter, said thickened fines stream and selectively delivering a resultant filtered water stream to the upstream flue gas desulfurization process.

6. The method as set forth in claim 5 wherein said downstream separation means comprise a second surge/mix tank, said second surge/mix tank being selectively supplied said thickened fines stream from said clarifier and mixing same with said fine solids stream prior to delivering the resultant mixed solution to said filter.

7. The method as set forth in claim 6 further comprising the step of selectively delivering the cleaned waste water from said secondary dewatering device to the upstream flue gas desulfurization process.

8. The method as set forth in claim 7 further comprising the step of disposing of any sludge collected in said downstream separation means and/or said secondary dewatering device.

* * * * *